Figure 1:
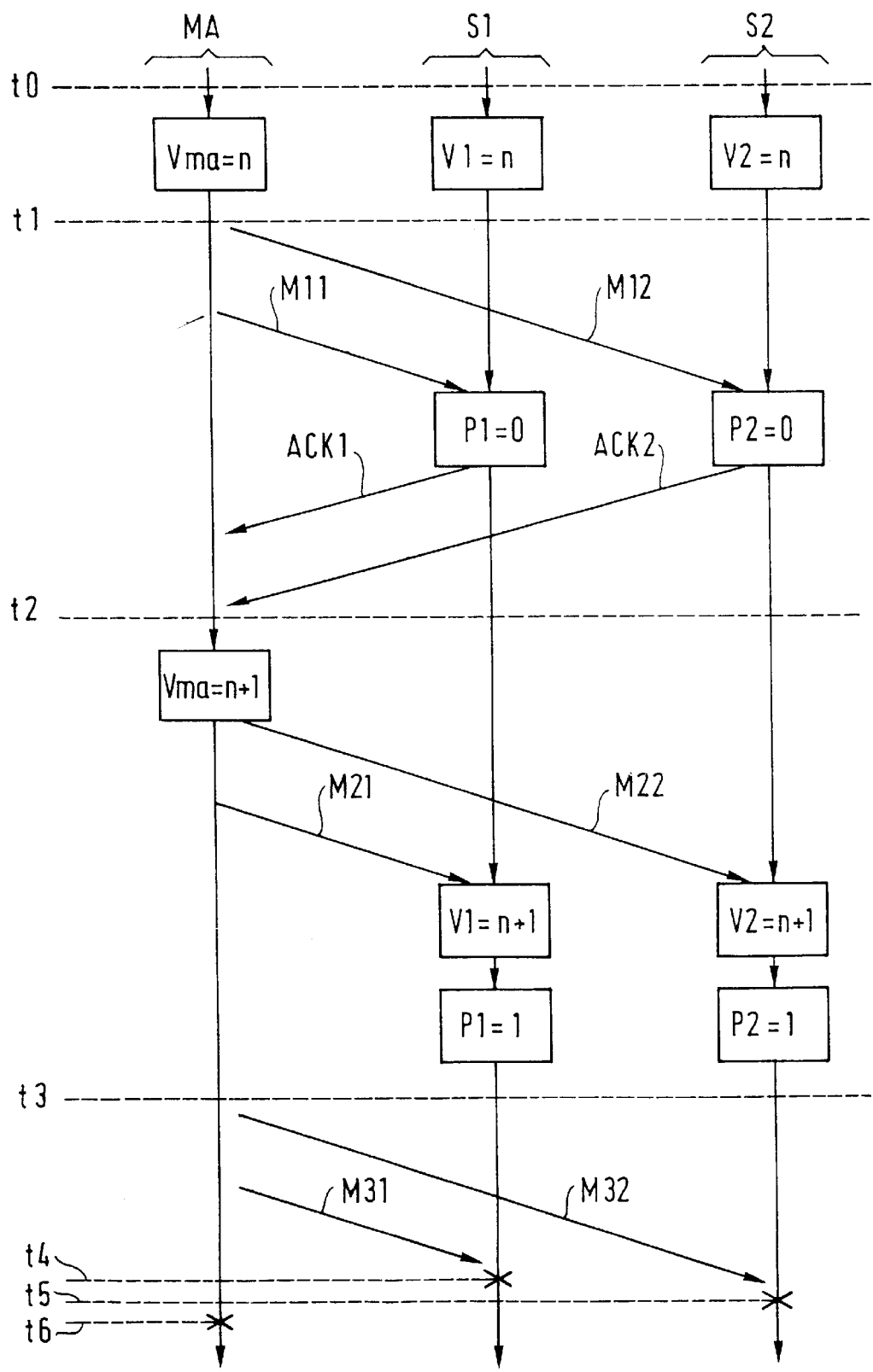

United States Patent [19]

Delannoy

[11] Patent Number: 5,905,896
[45] Date of Patent: May 18, 1999

[54] METHOD OF CHANGING SOFTWARE VERSION IN A COMPUTER SYSTEM COMPRISING A PLURALITY OF STATIONS, AND A COMPUTER SYSTEM FOR IMPLEMENTING THE METHOD

[75] Inventor: Olivier Delannoy, Boulogne-Billancourt, France

[73] Assignee: Alcatel Alsthom Compagnie Generale d'Electricite, Paris, France

[21] Appl. No.: 08/847,626

[22] Filed: Apr. 28, 1997

[30] Foreign Application Priority Data

Apr. 24, 1997 [FR] France .................................. 97 05068

[51] Int. Cl.⁶ ....................................................... G06F 9/44
[52] U.S. Cl. ..................................... 395/712; 395/200.51
[58] Field of Search ................................... 395/712, 703, 395/200.51

[56] References Cited

U.S. PATENT DOCUMENTS

| | | | |
|---|---|---|---|
| 4,785,397 | 11/1988 | Koizumi et al. ........................ | 395/712 |
| 5,410,703 | 4/1995 | Nilsson et al. .......................... | 395/712 |
| 5,421,009 | 5/1995 | Platt ..................................... | 395/200.51 |
| 5,495,610 | 2/1996 | Shing et al. ......................... | 395/200.51 |
| 5,742,829 | 4/1998 | Davis et al. ............................. | 395/712 |
| 5,752,042 | 5/1998 | Cole et al. ............................... | 395/712 |
| 5,784,563 | 7/1998 | Marshall et al. .................... | 395/200.51 |

OTHER PUBLICATIONS

"VM PWSCS Automated Software Service Distribution for Multiple Environments", IBM Technical Disclosure Bulletin, vol. 36, No. 9B, Sep. 1, 1993, p. 357/358 XP000397183.

*Primary Examiner*—Tariq R. Hafiz
*Assistant Examiner*—Tuan Q. Dam
*Attorney, Agent, or Firm*—Sughrue, Mion, Zinn, Macpeak & Seas, PLLC

[57] ABSTRACT

A method for automatically changing software version in a computer system comprising a plurality of stations that are to execute in parallel a plurality of replicas of the same software. A series of successively messages, communication protocol, between a master station and each slave station required for initializing and making necessary preparations at each of the slave stations prior to the version-change actual issued. In this way, without human intervention, all of the stations ensure that do restart after receiving the version-change order do indeed all restart actually executing the new version.

2 Claims, 2 Drawing Sheets

METHOD OF CHANGING SOFTWARE VERSION IN A COMPUTER SYSTEM COMPRISING A PLURALITY OF STATIONS, AND A COMPUTER SYSTEM FOR IMPLEMENTING THE METHOD

The invention relates to a method of changing software version in a computer system comprising a plurality of stations that are to execute in parallel a plurality of replicas of the same software.

When a current version of software needs to be replaced by a new version, it is necessary for all of the stations concerned to restart with the new version, particularly when the two versions are not absolutely compatible for communicating with each other. A known method consists in stopping all of the stations, installing the new version on each, and then restarting them one by one under the oversight of a human operator who verifies that each restarted station is actually executing the new version. That method has the drawback of interrupting service for a long time.

The object of the invention is to provide a method making it possible, without human intervention, to ensure that all of the stations that do restart after receiving a version-change order do indeed all restart actually executing the new version.

In a first aspect the invention provides a method of changing software version in a computer system comprising a plurality of stations, the method being characterized in that it consists in:

selecting one station as a master station, with the other stations being called slave stations;

providing each slave station with a flag;

installing the new version in each station, while continuing to execute the current version;

and in that it consists in the following successively and in this order:

the master station sending a first message to all of the slave stations;

on a slave station receiving this first message, it gives its flag an initial value indicating that the new version is not enabled;

a second message is sent by the master station to each slave station;

in each slave station that receives the second message, the new version is enabled by performing the preparations necessary for using it next time the slave station is started; the flag of the slave station is given a new value specifying, where appropriate, that preparations have succeeded; and the value of the flag is stored in a non-volatile memory;

the master station sends a third message to all of the slave stations to cause the slave stations to restart;

after which the master station restarts;

in each slave station that restarts, the value stored in the flag is tested and:

a if the value indicates that the preparations were successful, the new version is executed;

if the value indicates that the preparations did not succeed, neither the current version nor the new version is executed, and the slave station waits for orders from the master station.

The method characterized in this way avoids the stations re-starting, but not all executing the same version of the software. Because of the presence of a flag in each slave station, any slave station that has not successfully completed operations for version change does not continue by executing the old version, but waits for orders from the master station.

In a second aspect, the invention provides a computer system for changing software version in a computer system comprising a plurality of stations, one station being called the master station, and the others being called slave stations; characterized in that it comprises:

means for storing a flag in each slave station;

means for installing the new version in each station, while continuing to execute the current version;

means for issuing a first message from the master station to all the slave stations;

means in each slave station for responding to reception of the first message by giving the flag of said slave station an initial value indicating that the new version has not been enabled;

means for subsequently issuing a second message from the master station to each slave station;

in each slave station, means for enabling the new version by making the preparations necessary for using it next time the slave station is started, the new version being enabled when the slave station receives said second message; and means for giving the flag of said slave station a new value indicating, where appropriate, that the preparations were successful, and for saving said value of the flag in non-volatile memory;

means for issuing a third message from the master station to all of the slave stations to cause said slave stations to restart;

means for subsequently causing the master station to restart; and in each slave station, means for testing the stored value of the flag; and if the value indicates that the preparations were successful, executing the new version; and if the value indicates that the preparations were not successful, executing neither the current version nor the new version, and waiting for orders from the master station.

These means are preferably software means which are executed by the processor or the processors of each station, as is the software whose version is to be changed. The implementation of such software means is within the competence of the person skilled in the art, once that person knows what functions need to be implemented.

Figure 2:
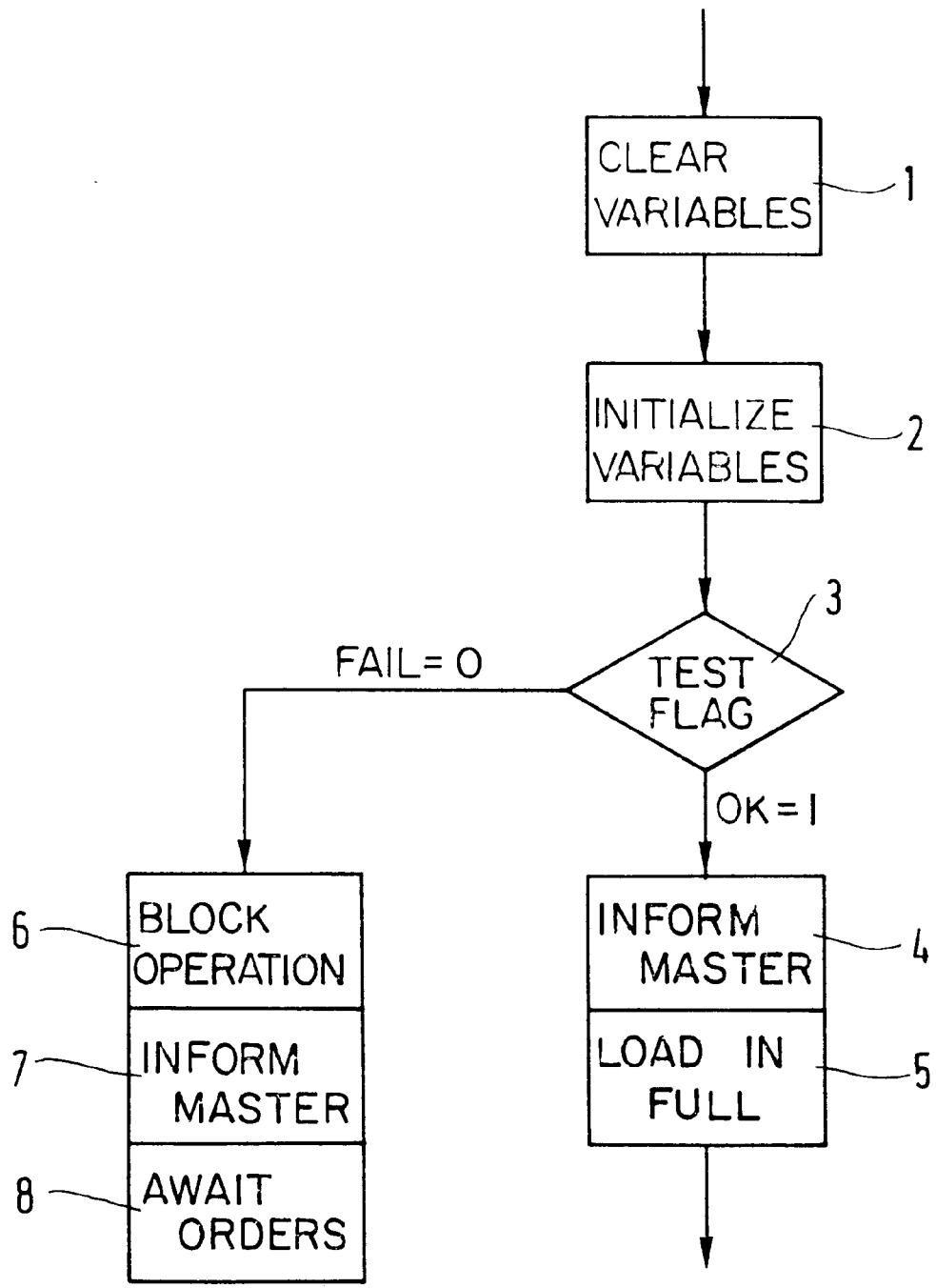

The invention will be better understood and other characteristics appear from the following description and the accompanying drawings:

FIG. 1 is a diagram of the messages interchanged between stations in an implementation of the method of the invention; and FIG. 2 is a flow chart of operations performed in each slave station on restarting, in this particular implementation.

In this example, the system comprises a master station MA and two slave stations S1 and S2. Each station stores in a non-volatile memory the version number of the software that it is to execute on the next occasion that the station restarts. In stations MA, S1, and S2, the version which is to be executed is designated respectively by Vma, V1, and V2. Each slave station also stores in a non-volatile memory, the value of a flag specifying whether preparations for executing this version have or have not managed to install said version. This flag is called P1 and P2 in stations S1 and S2 respectively.

The time diagram of FIG. 1 begins at an instant t0 when all of the stations M1, S1, and S2 are executing a version n of the software in question. At an instant t1, the master station sends a message M11 and a message M12 to the same stations S1 and S2 respectively instructing them to reinitialize their respective flags P1 and P2 to zero. They execute this order, and then each of them issues a respective acknowledge message ACK1 and ACK2, thereby enabling the master station MA to verify that the messages M11 and M12 have indeed been received and executed by all of the stations that are supposed to be active. If one of the acknowledgments is missing, then the master station MA aborts the version change and warns the user. The user can relaunch a version change later on.

At instant t2, once the master station MA has observed that all of the stations that are supposed to be active have responded with an acknowledgment, it begins to change version by making preparations for a version change. The software of version n+1 is already present in all of the stations, so the preparations consist merely in informing all of the slave stations S1, S2 that it is the version n+1 which is to be used next time software is loaded.

The master station sets the variable Vma to the value n+1, thereby specifying the version which is to be executed next time the master station MA starts. It then sends messages M21 and M22 to cause the slave stations S1 and S2 to give the value n+1 to the variable V1 and to the variable V2. If a slave station succeeds in performing this preparation, it sets its flag to the value 1. In this example, both slave stations S1 and S2 have succeeded in making their preparations, so each of them gives the value 1 to its own flag P1 or P2.

The master station MA waits for a length of time that is long enough to ensure that all of the slave stations have made their preparations, and then at an instant t3 it issues messages M31 and M32 for the stations S1 and S2 instructing them to restart. These stations restart at respective instants t4 and t5. Finally, the master station itself restarts at instant t6. In this example, all of the stations MA, S1, and S2 restart and execute the new version n+1 since they have all succeeded in performing the version change preparations.

FIG. 2 is a flow chart of the operations performed in each slave station on restarting:

Operation 1 consists in resetting to zero all variables which are not backed up.

Operation 2 consists in reinitializing certain variables with predetermined values.

Operation 3 consists in testing the value of the flag Pi of the station under consideration:

If Pi=0, that means the station has not succeeded in its version change preparations. Operations 6, 7, and 8 then consist in preventing the station from operating; in sending a message to the master station to inform it that this particular slave station is blocked because of a failure in preparations for changing version, and then waiting for orders from the master station to remedy this situation.

If Pi=1, that means the station has been successful in its version change preparations. It will therefore execute the new version. Operation 4 then consists in sending a message to the master station to inform it that the slave station is active, and operation 5 consists in finishing off initialization and loading software components of the operating system and of applications. The station is operational.

The method of the invention is applicable in analogous manner to a larger number of slave stations. Also, it is applicable in analogous manner if each station is shadowed by a redundant backup station: version change in the normal stations is performed as described above, in parallel and independently, the same process is applied to the backup stations.

I claim:

1. A method of changing software version in a computer system comprising a plurality of stations, the method being characterized in that it consists in:

selecting one station (MA) as a master station, with the other stations (S1, S2) being called slave stations;
providing each slave station with a flag (P1, P2);
installing the new version (n+1) in each station, while continuing to execute the current version;
and in that it consists in the following successively and in this order:
the master station sending a first message (M11, M12) to all of the slave stations;
on a slave station receiving this first message, it gives its flag an initial value (0) indicating that the new version is not enabled;
a second message (M21, M22) is sent by the master station to each slave station;
in each slave station that receives the second message, the new version is enabled by performing the preparations necessary for using it next time the slave station is started; the flag of the slave station is given a new value (1) specifying, where appropriate, that preparations have succeeded; and the value of the flag is stored in a non-volatile memory;
the master station sends a third message (M31, M32) to all of the slave stations to cause the slave stations to restart;
after which the master station restarts;
in each slave station that restarts, the value stored in the flag is tested (3) and:
if the value indicates that the preparations were successful, the new version is executed (4,5);
if the value indicates that the preparations did not succeed, neither the current version nor the new version is executed, and the slave station waits (8) for orders from the master station.

2. Apparatus for changing software version in a computer system comprising a plurality of stations, one station (MA) being a master station, and the other stations (S1, S2) being called slave stations; the apparatus being characterized in that it comprises:

means for storing a flag (P1, P2) in each slave station;
means for installing the new version (n+1) in each station, while continuing to execute the current version;
means for issuing a first message (M11, M12) from the master station (MA) to all the slave stations;
means in each slave station for responding to reception of the first message by giving the flag of said slave station an initial value (0) indicating that the new version has not been enabled;
means for subsequently issuing a second message (M21, M22) from the master station to each slave station;
in each slave station, means for enabling the new version by making the preparations necessary for using it next time the slave station is started, the new version being enabled when the slave station receives said second message; and means for giving the flag of said slave station a new value (1) indicating, where appropriate, that the preparations were successful, and for saving said value of the flag in non-volatile memory;
means for issuing a third message (M31, M32) from the master station to all of the slave stations to cause said slave stations to restart;
means for subsequently causing the master station to restart; and
in each slave station, means for testing (3) the stored value of the flag; and
if the value indicates that the preparations were successful, executing (4,5) the new version; and
if the value indicates that the preparations were not successful, executing neither the current version nor the new version, and waiting (8) for orders from the master station.

* * * * *